United States Patent [19]

Wood et al.

[11] Patent Number: 5,594,826

[45] Date of Patent: Jan. 14, 1997

[54] INTERCHANGEABLE NOSE ADAPTER

[75] Inventors: Robert J. Wood, Syracuse; Terrence L. Salisbury, Weedsport; Connie R. Walts, Auburn; Michael J. Pileski, Skaneateles, all of N.Y.

[73] Assignee: Welch Allyn, Inc., Skaneateles Falls, N.Y.

[21] Appl. No.: 504,218

[22] Filed: Jul. 19, 1995

[51] Int. Cl.[6] .................................................. G02B 6/36
[52] U.S. Cl. .................................. 385/88; 385/92; 385/91
[58] Field of Search ......................................... 385/88–94

[56] References Cited

U.S. PATENT DOCUMENTS

| | | | |
|---|---|---|---|
| 3,803,409 | 4/1974 | Prochazka | 385/92 |
| 4,179,801 | 12/1979 | Hollis | 385/92 |
| 4,232,934 | 11/1980 | Feinbloom | 385/88 |
| 4,273,413 | 6/1981 | Bendiksen et al. | 385/92 |
| 4,307,934 | 12/1981 | Palmer | 350/96.2 |
| 4,385,797 | 5/1983 | Dubois et al. | 350/96.2 |
| 4,397,523 | 8/1983 | Feinbloom et al. | 385/88 |
| 4,557,554 | 12/1985 | Blanc | 385/88 |
| 4,824,202 | 4/1989 | Auras | 385/92 |
| 5,029,970 | 7/1991 | Hengst et al. | 385/88 |
| 5,151,961 | 9/1992 | Hvezda et al. | 385/92 |
| 5,163,114 | 11/1992 | Hendow | 385/88 |
| 5,263,108 | 11/1993 | Kurokawa et al. | 385/89 |
| 5,329,541 | 7/1994 | Brown | 385/88 |

FOREIGN PATENT DOCUMENTS 0081192  6/1983  European Pat. Off. ............. 385/92

OTHER PUBLICATIONS

Guttmann; May 1975 / vol. 14, No. 5 / Applied Optics; pp. 1225–1227.

Primary Examiner—John Ngo
Attorney, Agent, or Firm—Harris Beach & Wilcox, LLP

[57] ABSTRACT

A nose adapter for use with light boxes that illuminate fiberoptic light bundles. A retaining member is provided with a mounting aperture having predetermined standardized interior dimensions. One or more insert members are each provided with standardized exterior dimensions which are approximately equal to those of the mounting aperture, and with interior dimensions which are approximately equal to those of the end of a particular light bundle. First fastening means allows the light bundle to be easily inserted into and removed from its insert. Second fastening means allows the nose adapter as a whole to be easily attached to and detached from the light box.

15 Claims, 4 Drawing Sheets

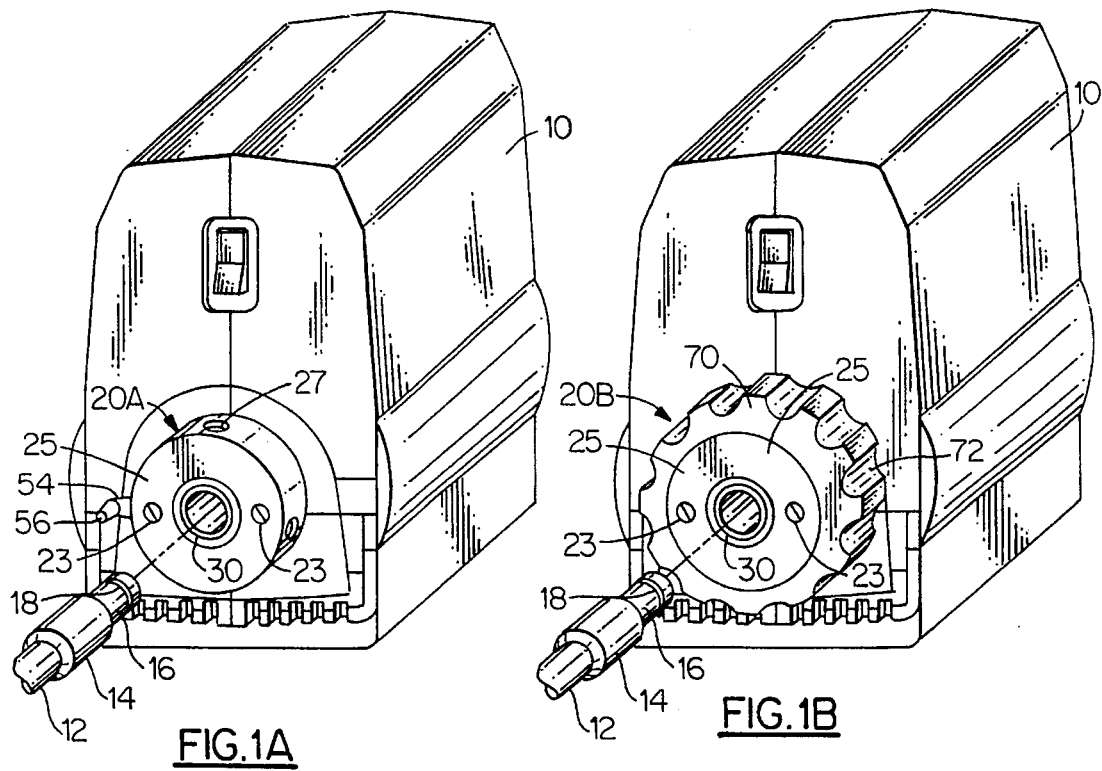
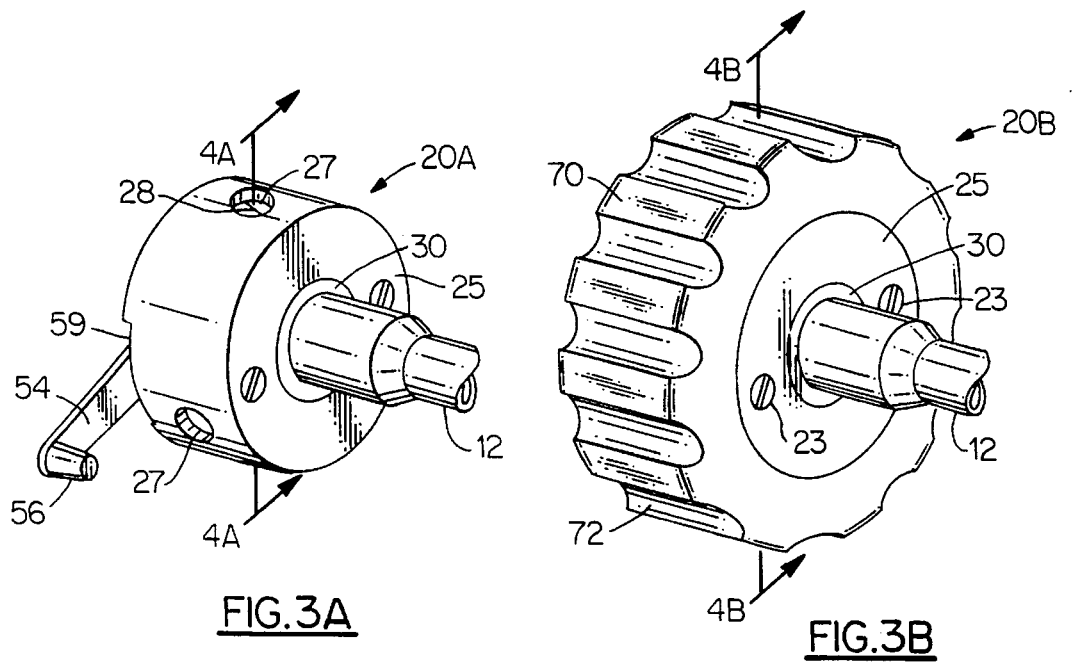

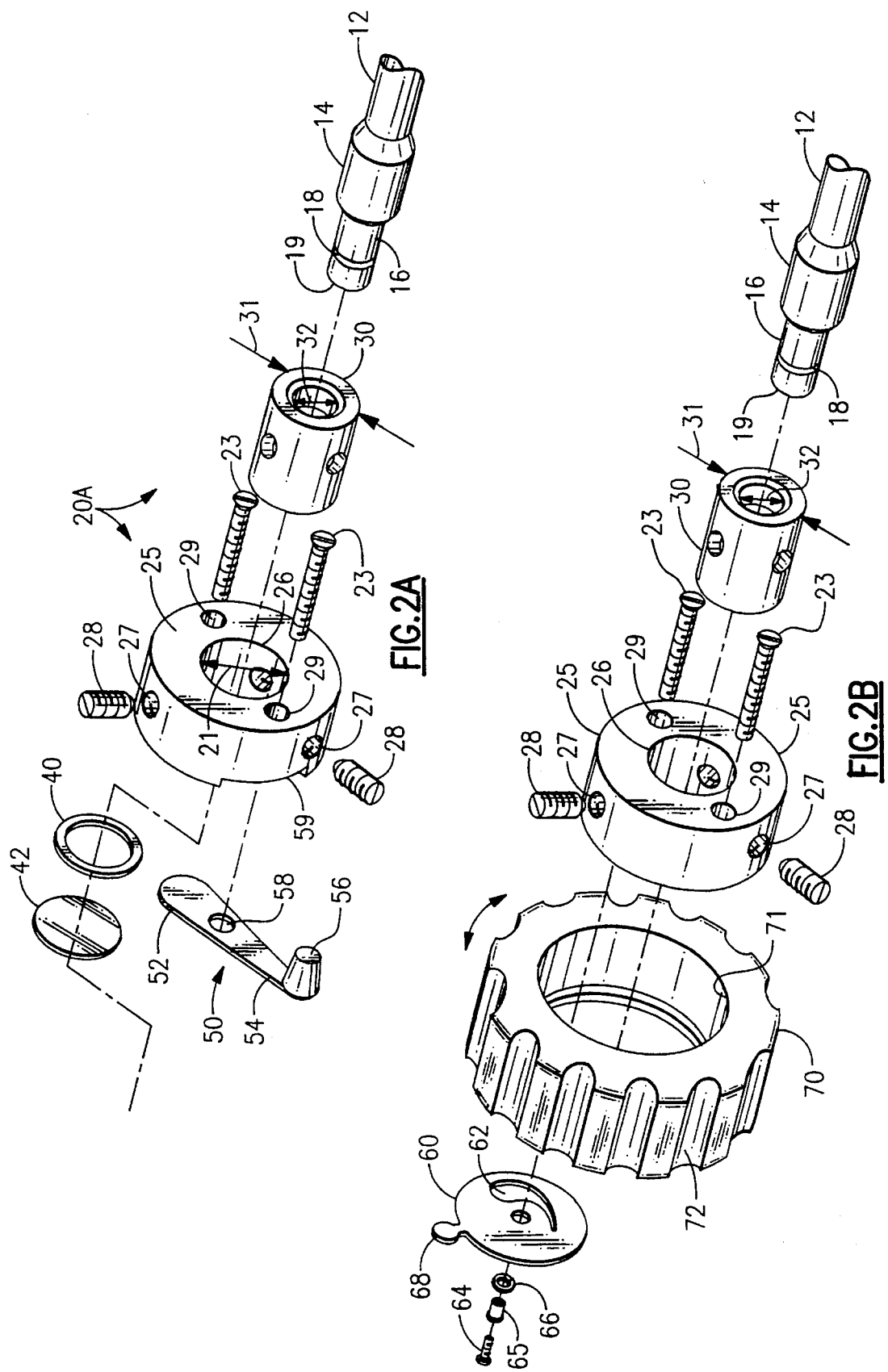

INTERCHANGEABLE NOSE ADAPTER

BACKGROUND OF THE INVENTION

The present invention relates to light boxes for illuminating fiberoptic light bundles, and is directed more particularly to a nose adapter which allows light boxes to be used with a variety of different sizes and types of fiberoptic light bundles.

Because of their effectiveness and ease of use, fiberoptic illumination systems have become widely used in medical examination devices such as otoscopes, episcopes and the like. The fiberoptic light bundles used in such systems are able to provide bright illumination over considerable distances because light is transmitted therethrough by the highly efficient process of internal reflection. Such fiberoptic light bundles also have a flexibility which makes them easy to manipulate and steer, properties which are particularly important in instruments such as endoscopes which are used inside of a patient's body.

Because of the wide variety of applications in which fiberoptic light bundles are used, they are made in a wide range of sizes such as, for example, 2.5 to 12.5 min. In addition to being made in different sizes, fiberoptic light bundles are manufactured with a variety of different types of fiberoptic connectors.

Prior to the present invention, a number of attempts have been made to develop light box adapters (often referred to as "nose adapters") which allow light boxes to be used with different sizes and types of connectors. One type of such adapter includes adapters of the so-called "universal" type. In adapters of this type a set of spring loaded pins is used to clampingly engage male fiberoptic connectors of all different sizes. Examples of adapters of this type are described in U.S. Pat. Nos. 4,232,934 (Feinbloom) and 4,397,523 (Feinbloom). One disadvantage of adapters of this type is that the amount of clamping force applied to the fiberoptic connector is greater for large diameter bundles than for small diameter bundles, causing the forces necessary to insert and remove the connector to be different for different sizes of connectors.

Another type of light box adapter includes adapters which make use of rotatable turrets having female connectors of a number of different sizes. One example of such a turret equipped light box is that sold under the product designation MT-150 by CUDA Products Corp. of Jacksonville, Fla. Disadvantages of adapters of this type include their relatively high cost, the fact that they accommodate a relatively small number of male connectors, and the fact that a separate turret must be provided for each different type of connector.

Thus, a need has existed for a light box adapter which is inexpensive to manufacture, easy to use, and able to accommodate a number of different sizes and types of light bundles.

SUMMARY OF THE INVENTION

In accordance with the present invention, there is provided an improved nose adapter which is inexpensive to manufacture, and easy to attach, detach and interchange.

Generally, speaking, the nose adapter of the invention includes an annular retaining or mounting member, preferably composed of a thermally non-conductive plastic material, which includes a central aperture which is larger than the largest diameter light bundle to be used with the associated light box. The nose adapter of the invention also includes an insert or mounted member, preferably composed of a corrosion resistant metal, such as stainless steel, which has exterior dimensions that allow it to fit closely with said central aperture, and which has an interior opening with dimensions that allows it to receive a particular size and type of light bundle. Thus, by combining a relatively large outer element which has standardized interior dimensions with a relatively small inner element which has standardized exterior dimensions but light bundle-specific interior dimensions, the invention provides a nose adapter which can be used with a large number of different light bundles and yet can be manufactured at a low cost.

In keeping with its objective of achieving a low cost of manufacture, the retaining member of the invention includes a first fastening mechanism which allows it to be mounted directly on the front panel of the light box. This mechanism, which may be as simple as two screws, allows the retaining member to be accurately and repeatably positioned with respect to the light exit port of the light box. This, in turn, allows the end of that light bundle to automatically assume the desired position with respect to the light source inside the light box.

Similarly, the adapter of the invention includes a second fastening mechanism which allows the insert to be secured within the retaining member in a position in which the above mentioned positioning relationships are established. This mechanism, which preferably comprises a plurality of ball detents, allows the light bundle to be held securely within the respective insert member, and yet allows the light bundle to be removed and reinserted with a relatively small amount of force, without regard to the size of the light bundle. This invariance of force with size is possible because the ball detents are adjusted differently for different sizes of inserts. As a result, unlike "universal" adapters, the nose adapter of the invention provides similar action and "feel" for all different sizes and types of light bundles.

In the preferred embodiment of the invention, the nose adapter is provided with a manually rotatable light vane for adjusting the fraction of the light from the light source which is allowed to fall on the end of the light bundle. This light vane is preferably included as a part of the nose adapter. This allows the vane mechanism to be changed each time that the nose adapter is changed, thereby allowing each type and size of light bundle to be used with the size and type of light vane which is best suited for operation therewith.

DESCRIPTION OF THE DRAWINGS

Other objects and advantages of the invention will be apparent from the following description and drawings, in which:

FIGS. 1A and 1B are oblique assembly views of light boxes which include nose adapters constructed in accordance with the present invention;

FIGS. 2A and 2B are exploded views of the nose adapters shown in FIGS. 1A and 1B, respectively;

FIGS. 3A and 3B are enlarged, oblique views of the nose adapters of FIGS. 1A and 1B, respectively;

DESCRIPTION OF THE PREFERRED EMBODIMENTS

Figure 4A:
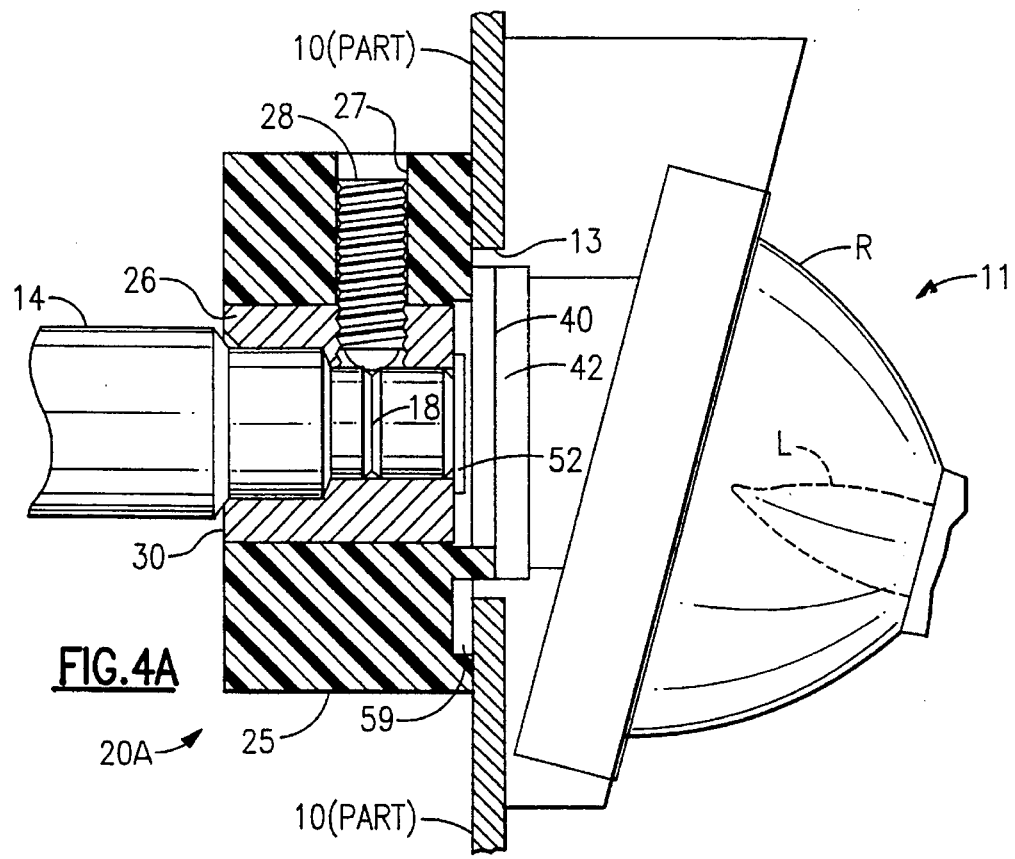
FIGS. 4A and 4B are enlarged, fragmentary cross-sectional views of the nose adapters of FIGS. 1A and 1B shown adjacent to the light bundles and light sources which operate in conjunction therewith.

Referring to FIG. 1A and 1B there is shown a light box 10 for directing light against the end of an fiberoptic light bundle 12 which, in turn, supplies light to a medical examination device such as an otoscope, ophthalmoscope, etc. (not shown). Light bundle 12, which may have a diameter from about 2.5 mm to about 12.5 mm, is equipped with an end connector or fitting 14 which typically includes a metal sleeve 16 having a groove 18 that may be used locking the light bundle in place with respect to light box 10. Connector 14 serves in part to allow the accurate positioning of the end 19 of the light bundle with respect to a light source assembly 11, which includes a reflector R and a lamp L (shown in dotted lines in FIGS. 4A and 4B). Ordinarily, this involves the holding of end 19 substantially at the focal point of a reflector R which serves to direct as much as possible of the light from lamp L onto the optical fibers which terminate at end 19. Connector 14 also serves in part to protect the end of light bundle 12 from the damage that can result from its being repeatedly connected to and disconnected from box 10.

To the end that light bundles having any of a variety of different sizes and connector types may be mountably positioned in the desired positions with respect to light source assembly 11, the present invention provides a nose adapter assembly which facilitates the attachment, detachment and interchange of such light bundles. In its broadest aspect, the nose adapter of the invention includes an outer, retaining member which may be easily attached to and detached from the front panel of light box 10 without opening the latter, and which includes a central aperture having predetermined, standardized interior dimensions. The nose adapter of the invention also includes an inner, insert member having exterior dimensions which closely match those of this central aperture, but having interior dimensions that closely match those of a fiberoptic connector of a particular size and type. Because the retaining member can be manufactured at a low cost and can be used with inserts of any of a variety of different sizes, the nose adapter of the invention may be cost effectively provided for each of the different sizes and types of light bundles with which the light box may be used. This, in turn, allows any of a wide variety of different sizes and types of light bundles to be easily and quickly attached to and detached from the light box, thereby making it practical to use a single light box with any of a plurality of different medical examination devices.

Referring to FIGS. 1A through 4A, a first embodiment of the nose adapter of the invention as a whole is indicated by the designation 20A. As is best shown in FIG. 2A, nose adapter 20A includes a retaining member 25 which preferably has an annular shape and which is preferably composed of a relatively thermally non-conductive material such as a suitable plastic. Nose adapter 20A also includes an insert member 30 which also has a generally annular shape, but which is smaller than retaining member 25 and is preferably composed of a relatively chemically inert material such as stainless steel. In accordance with the present invention, retaining member 25 is provided with a central mounting aperture 26 having a predetermined, standardized inner dimension 21 which is larger than the largest fiberoptic connector with which light box 10 is to be used. In addition, insert member 30 has a predetermined, standardized outer dimension 31 which is selected to fit closely within central aperture 26, and an inner opening 32 having dimensions which enable it to receive a particular size and type of fiberoptic connector. Because of these dimensional relationships, a light bundle having any of a plurality of different sizes and any of a plurality of different types of fiberoptic connectors may be made to fit snugly within a nose assembly having fixed outer dimensions.

To the end that light bundle 12 may be secured in the desired position with respect to nose adapter 20A and, consequently, in the desired position with respect to the focal point of light source assembly 11, retaining member 25 and insert member 30 are provided with a plurality of aligned holes 27 which are adapted to receive respective spring loaded fasteners 28. Holes 27 preferably comprise a triad of radially disposed threaded holes which are spaced at 120 degree intervals around the circumference of retainer 25. Fasteners 28 each preferably, but not necessarily, comprises a fastener of the type, commonly known as a "ball detent", which includes a interior passage containing a spring-loaded ball element. The latter type of fastener is preferred both because its ball element is able to engage the groove 18 of the fiberoptic connector and thereby exert an axial positioning force thereon, and because the internal spring thereof allows the fastener to apply a gentle and uniform radial clamping force to the light bundle. More importantly, however, a ball detent fastener is preferred because of the ability it provides for a light bundle (or a number of light bundles of the same size and type) to be easily removed, reinserted or interchanged by merely pulling them out of or pushing them into nose adapter 10 without detaching the latter. If light bundles of different sizes are to be used, the nose adapter as a whole is removed and replaced by a similar nose adapter having an insert of the required size and type. After such an interchange light bundles of the new size can be removed, reinserted or interchanged with approximately the same amount of force as the previous size. This is because the ball detents of all sizes of nose adapters are adjusted to produce an approximately uniform or standardized level of clamping force.

Figure 4B:
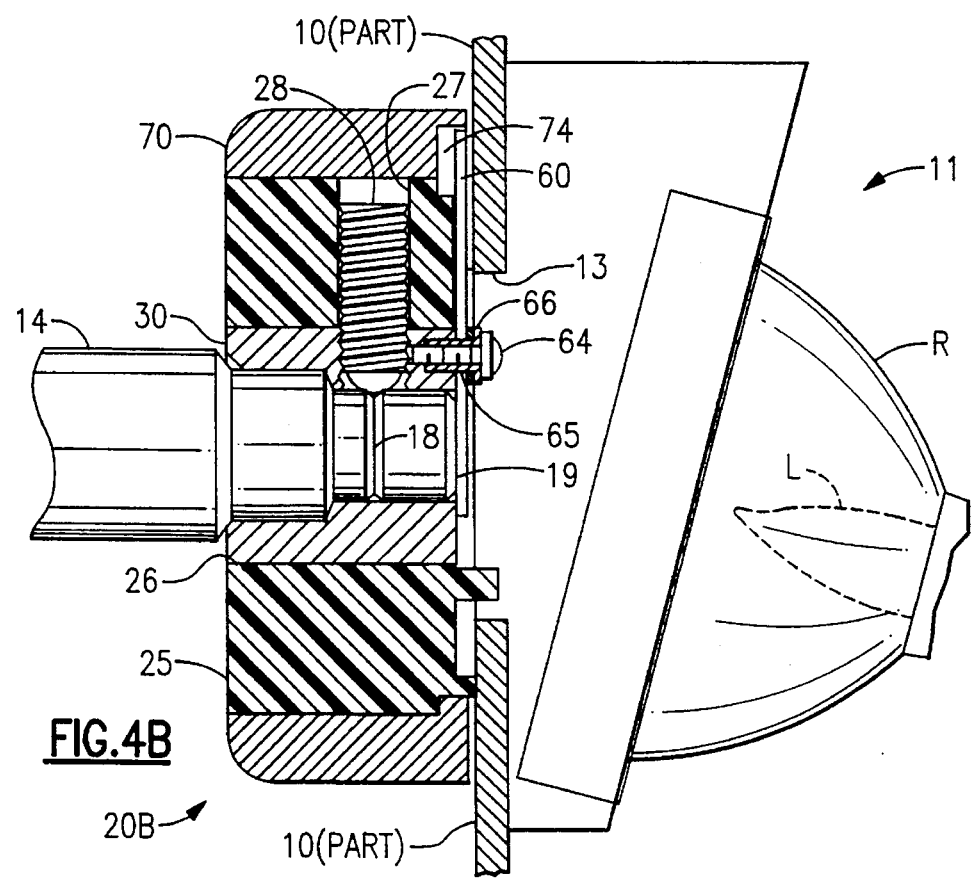

It will be understood that the exact position of holes 29 is selected so that, for any of the possible insert members which may be used with retainer 25, the engagement of the ball element with the groove of the fiberoptic connector used therewith causes the end of that light bundle to assume the desired position with respect to light source assembly 11. This does not mean that the outer end face of insert 30 is necessarily flush with the outer end face of retainer 25, as shown in FIGS. 1A, 3A and 4A, however, since the size and shape of the fiberoptic connector may cause the insert to project outwardly with respect to the outer face of retainer 25.

In accordance with the present invention, the nose adapter is constructed so that it may be easily attached to and detached from the front panel of light box 10 without opening the same. In the preferred embodiment this feature is provided by including in retainer 25 a pair of axially disposed mounting holes 29 which are located on either side of central aperture 26, and which are adapted to engage a pair of cooperating threaded mounting holes in the front panel of box 10. The latter pairs of holes allow the nose adapter assembly as a whole to be easily and detachably secured to box 10 with central aperture 26 centered on the light exit port thereof, as shown in FIG. 4A. This is most inexpensively accomplished with a pair of screws 23, which may be either tool or finger tightenable. It will be understood, however, that other types of fasteners, such as spring-loaded clips or magnetic fasteners can be used in place of screws 23, provided that appropriate mating structures or elements are included on the front panel of light box 10. The important thing is that, when one insert-bearing nose adapter is removed and replaced by another, the associated light bundles are automatically positioned in the proper position to receive the desired quantity and quality of light.

In addition to serving as a standardized mounting platform for a variety of different sizes and types of light bundle connectors, retaining member 25 may also serve as a mounting platform for a variety of different accessory structures which may, but need not be, dedicated to use with particular respective light bundles. One example of an accessory structure that might be used in this way is an infrared filter, which is important to the use of intrabody instruments such as endoscopes, but which is less important in extrabody instruments such as ophthalmoscopes. A filter of the latter type is shown as the elements labelled 40 and 42 in FIG. 2A. As suggested by FIG. 4A, such a filter may be permanently secured to the inner face of retaining member 25 and, consequently, dedicated to use with light bundles of a particular size or type. In this way a set of differently equipped nose adapters may be customized for different respective applications, and then easily and quickly put in place each time that those applications are called for.

Examples of an accessory that is usable with the nose adapter of the invention without regard to the size or type of the light bundle used therewith include the light adjusting assemblies shown in FIGS. 2A and 2B. In the simple, low cost embodiment shown in FIGS. 1A through 4A, the light adjusting assembly includes a paddle-shaped light adjusting vane 50 having a light blocking end 52 which may be moved to block the desired fraction of the light from lamp L that reaches light bundle end 19 by means of a lever arm 54 and a knob 56. In this embodiment adjusting vane 50 has an axis of rotation that is aligned with the center of a suitable mounting hole 58. The latter hole may be journalled for rotation about one of mounting screws 23 and be held in place between retainer 25 and the front of light box 10 by the fastening forces existing therebetween, space therefor being provided by a shallow recess 59 in the inner face of retainer 25, as is best shown in FIG. 3A. Alternatively, light vane 50 may be rotatably attached to the inner face of retainer 25, independently of screw 23, by a C-washer or other rotation permitting fastener of a type known in the art.

In the more costly but more sophisticated and aesthetically pleasing embodiment of the nose adapter shown in FIGS. 1B–4B and 5 and 6, the light adjusting assembly comprises a vane 60 that defines a elongated curvilinear opening 62. As is most clearly shown in FIGS. 5 and 6, this opening is offset from the center of plate 60, which is journalled for rotation with respect to the nose adapter by a mourning screw 64, a sleeve 65, and a suitable wave washer 66. In operation sleeve 65 functions as a bushing, while wave washer 66 functions as a spring to keep the pans in tight but movable contact with one another. As is most clearly shown in FIG. 4B, screw 64 may be threadingly secured to the rear of insert 30.

Because opening 62 of light vane 60 has a shape similar to that of a teardrop, the fraction of light from lamp L which reaches light bundle end 19 may be adjusted while assuring that this light is directed against the central portion of end 19. This centering action may be seen by comparing the amount of light which is blocked from end 19 when vane 60 is in the position shown in FIG. 5 and the amount of light which is blocked from end 19 when vane 60 is in the position shown in FIG. 6. This centering action is desirable because, unlike the single sided blocking action produced by paddle shaped vanes, it produces no noticeable shift in the light distribution pattern which is established at the distal end of the light bundle as the light level is adjusted.

While the angular position of vane 60 may be controlled by means of an outwardly projecting arm, such as arm 54 of FIG. 2A, it may also be controlled by means of an adjusting knob that surrounds and is rotatably attached to retaining member 25. An embodiment of the invention which includes such a knob is shown in FIGS. 1B–4B and 5 and 6. In the latter Figures the adjusting knob is indicated by the designation 70. As is most clearly shown in FIGS. 2B, 5 and 6, the interior portion of adjusting knob 70 includes a hole 71 having a diameter which enables it to slip over retainer 25 and slidably rotate with respect thereto, and the outer portion thereof includes an easily gripped, preferably fluted, surface 72.

Figure 5:
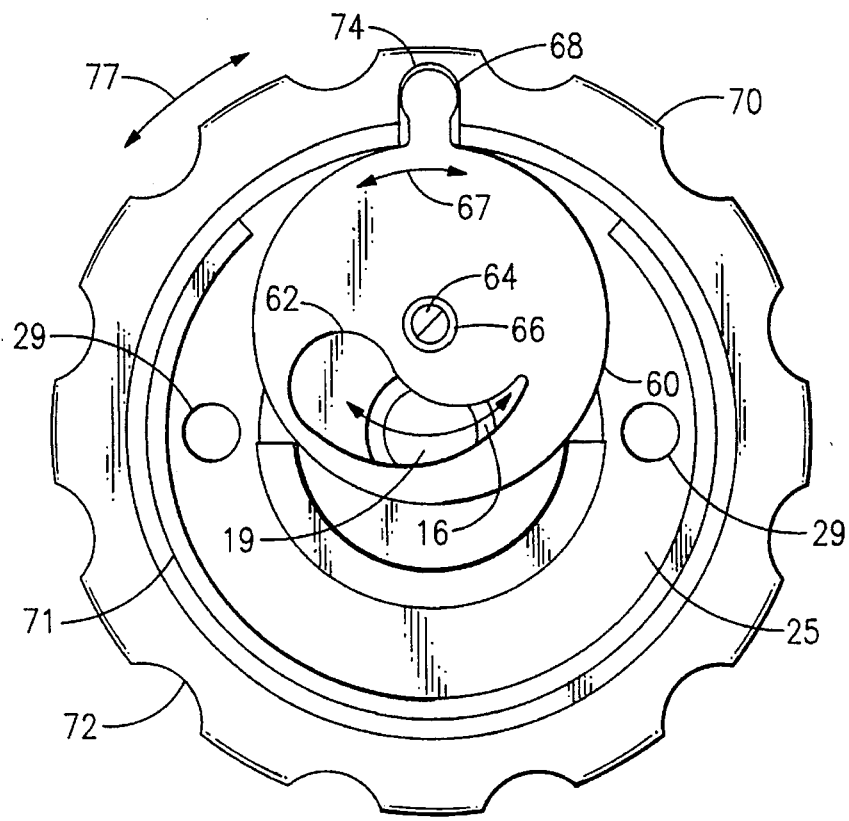
FIGS. 5 and 6 are rear views of the nose adapter of FIGS. 1B–4B which illustrate the structure and operation of the light vane thereof.
Figure 6:
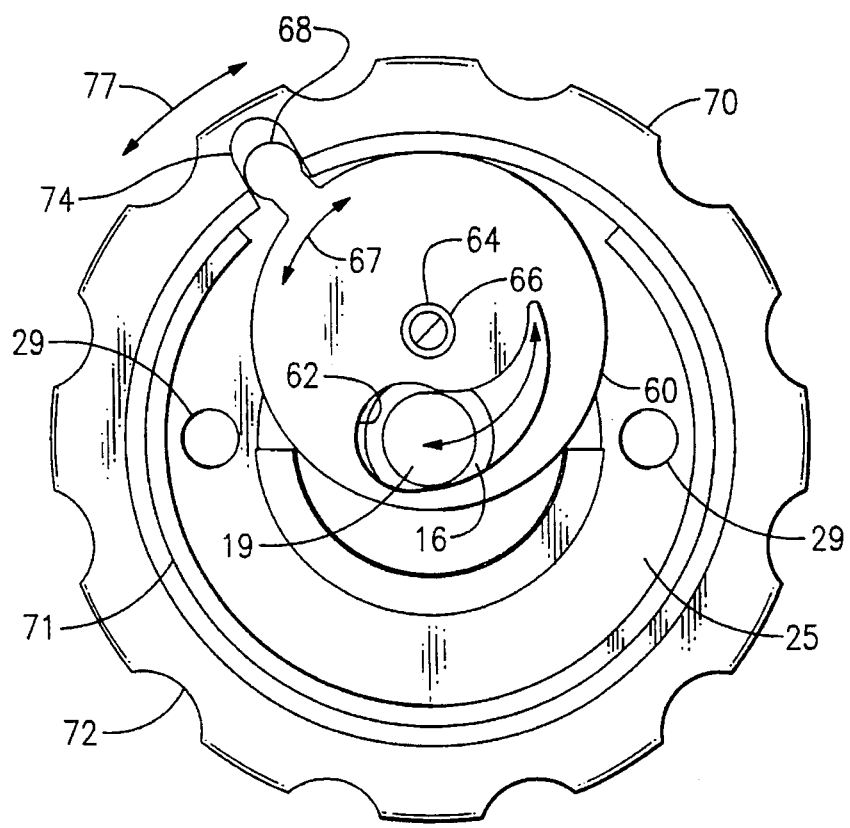

To the end that the rotation of knob 70 may cause light vane 60 to rotate in the manner shown in FIGS. 5 and 6, vane 60 is provided with a radially disposed tab or projection 68, and knob 70 is provided with a radially disposed groove 74 which is adapted to movably engage that tab. Because of the latter engagement, the rotation of knob 70 about the center of the nose adapter, i.e., in the direction indicated by arrow 77, causes vane 60 to rotate about the axis of screw 66, i.e., in the direction indicated by arrow 67. As this occurs, opening 62 sweeps across the end 19 of the light bundle to produce the above-discussed shuttering action. Thus, the embodiment of FIGS. 1B–4B and 5 and 6 represents both a functional and an aesthetic improvement of the embodiment of FIGS. 1A–4A.

While the nose adapter of the invention has been described with reference to a number of different embodiments, it will be understood that the true spirit and scope of the present invention should be determined with reference to the appended claims.

What is claimed is:

1. A nose adapter for mountably positioning an end of a fiberoptic light bundle including a plurality of fiberoptic fibers in proximity to a light source located within a light box for providing illumination to an area to be illuminated, comprising:

a) a retaining member adapted to be attached to said light box, said retaining member defining a central aperture having predetermined interior dimensions and a plurality of radially disposed mounting holes;

b) an insert member having exterior dimensions which are approximately equal to the interior dimensions of said central aperture, said insert defining an interior opening for receiving the end of a light bundle having a predetermined size, and a plurality of radially disposed mounting holes which can be aligned with the mounting holes of the retaining member when the insert member is positioned within said central aperture;

c) first fastening means, adapted to extend through the mounting holes of said retaining member and insert member, for clampingly holding said end in a predetermined position with respect to said light source; and d) a rotatably mounted light vane for controlling the amount of light from said light source which falls on said end.

2. The nose adapter of claim 1 further including a manually operable ring, journaled for rotation with respect to the retaining member, for rotating said light vane when said ring is rotated with respect to said retaining member.

3. The nose adapter of claim 2 in which said light vane comprises a plate defining an off-center elongated curvilinear opening, and in which said light vane is journaled for rotation with respect to the retaining member so that the rotation of said ring causes said off-center opening to sweep across said end.

4. The nose adapter of claim 3 in which said off-center opening has a teardrop-like shape.

5. The nose adapter of claim 1 further including a plurality of additional insert members, each having exterior dimensions which approximate the interior dimensions of said central aperture, and having interior openings dimensioned to receive the ends of light bundles different respective sizes.

6. The nose adapter of claim 1 in which said first fastening means includes a plurality of ball detents.

7. The nose adapter of claim 1 further including second fastening means for attaching said nose adapter to and detaching said nose adapter from said light box without opening said light box.

8. The nose adapter of claim 7 in which the retaining member defines a plurality of axially disposed mounting holes, and in which the second fastening means comprises a plurality of threaded fastening elements.

9. A nose adapter for mountably positioning an end of a fiberoptic light bundle that includes a plurality of fiberoptic fibers in proximity to a light source located within a light box for illuminating an area to be illuminated, comprising:

a) retaining means for supportably retaining an insert, said retaining means defining a central aperture for receiving said insert;

b) an insert having exterior dimensions which allow said insert to fit relatively closely within said central aperture and interior dimensions which allow said end to fit relatively closely therein;

c) first fastening means for securing said end in a predetermined position with respect to said light source when said retaining means is secured to said light box; and d) second fastening means for attaching said retaining means to and detaching said retaining means from said light box without opening said light box.

10. The nose adapter of claim 9 further including light adjusting means for adjusting the amount of light transmitted from said light source to said end.

11. The nose adapter of claim 9 further including a paddle-shaped vane positioned between said adapter and said light box.

12. The nose adapter of claim 10 further including a manually operable ring, rotatably mounted on said adapter for rotating said light adjusting means.

13. The nose adapter of claim 12 in which said adjusting means comprises a plate having an off-center curvilinear opening, said opening being adapted to present a light aperture of variable size between said source and said end when said ring is rotated.

14. The nose adapter of claim 9 in which said insert defines a plurality of radially disposed openings and in which said first fastening means includes a plurality of ball detents positioned within said radially disposed openings.

15. The nose adapter of claim 9 in which said second fastening means defines a plurality of axially disposed openings and in which said second fastening means includes a plurality of threaded fasteners positioned within said axially disposed openings.

\* \* \* \* \*